Oct. 29, 1968     F. HAGMANN     3,407,788
EXPANSIBLE LINKAGE FOR A STEAM GENERATOR
Filed Jan. 11, 1967     2 Sheets-Sheet 1

Inventor:
FRITZ HAGMANN
BY
Kenyon & Kenyon
ATTORNEYS

Oct. 29, 1968 F. HAGMANN 3,407,788
EXPANSIBLE LINKAGE FOR A STEAM GENERATOR
Filed Jan. 11, 1967 2 Sheets-Sheet 2

Inventor:
FRITZ HAGMANN
BY
Kenyon Kenyon
ATTORNEYS

United States Patent Office 3,407,788
Patented Oct. 29, 1968

3,407,788
EXPANSIBLE LINKAGE FOR A
STEAM GENERATOR
Fritz Hagmann, Winterthur, Switzerland, assignor to
Sulzer Brothers, Limited, Winterthur, Switzerland,
a corporation of Switzerland
Filed Jan. 11, 1967, Ser. No. 608,555
Claims priority, application Switzerland, Oct. 5, 1966,
14,377/66
8 Claims. (Cl. 122—6)

ABSTRACT OF THE DISCLOSURE

The expansible linkage between the walls of a steam generator absorbs the variable heat expansion of the walls during operation of the generator. The congruent rhomboids of the linkage allow the linkage to elongate in two perpendicular directions upon heating to absorb the differential heat expansion transferred by the walls. The thickness of the sheet from which the linkage is made is substantially that of the tube walls in the generator walls.

---

Figure 1:
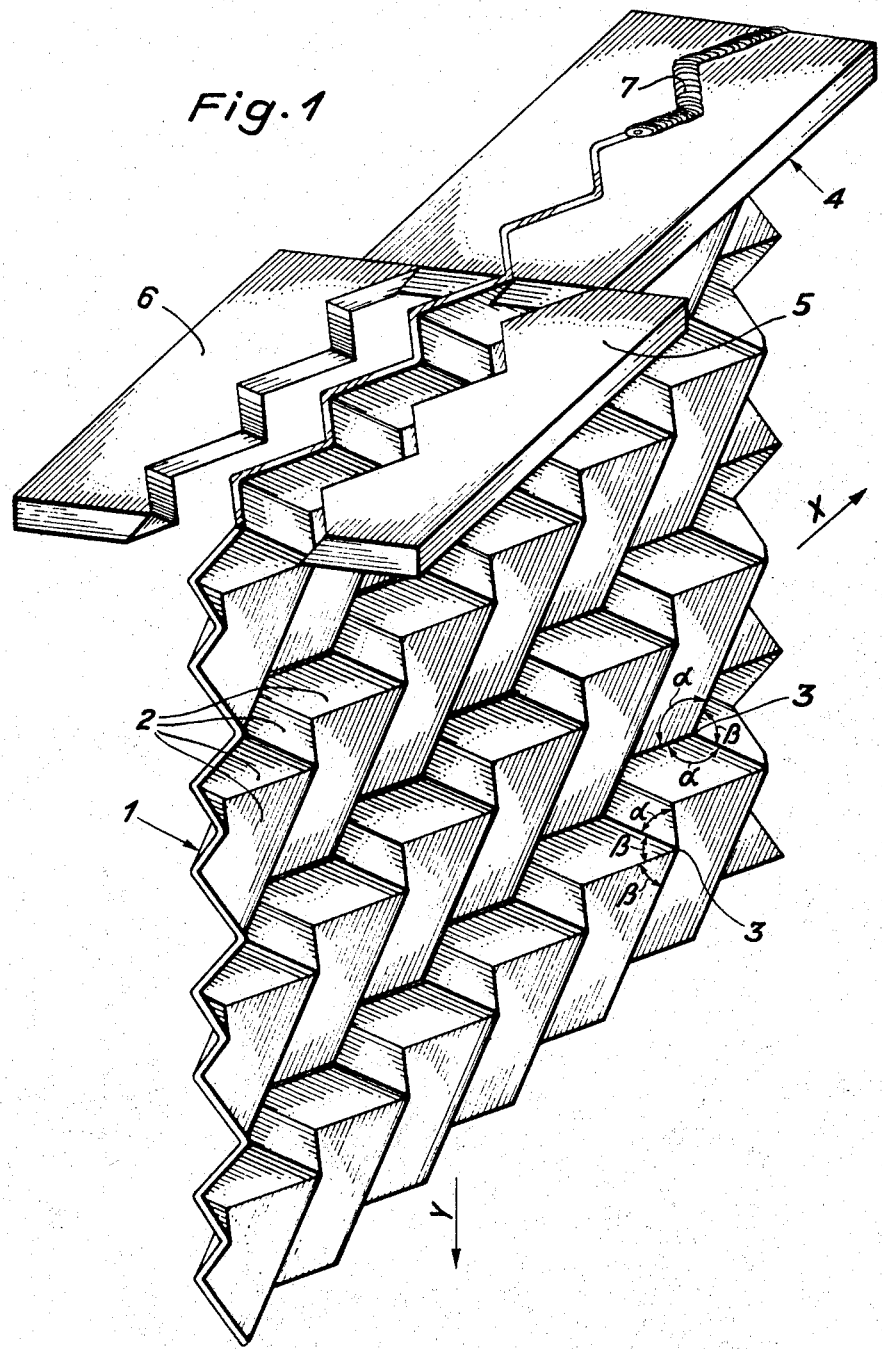

The invention relates to an expansible linkage for a steam generator. More particularly, the invention relates to an expansible linkage for securement between two adjacent walls of a steam generator.

Generally, the linings of steam generators, especially of the combustion chambers, are formed by overlapping tube plates which are each composed of a plurality of compactly welded tubes. However, when the steam generators are in operation as charged steam generators, these tube panels are subjected to uneven heat expansion. This requires bridgings at the transition from the backside of one tube plate to the backside of an adjacent tube plate in order to seal the chambers defined by the lining of tube plates from the outside as well as to follow the variable heat expansion of the tube plates.

Briefly, the invention provides an expansion linkage between adjacent walls of compactly welded tubes of a steam generator which seals the walls relative to each other while expanding under the variable heat expansions of the walls generated during the operation of the steam generator. The expansible linkage comprises an expansible metal sheet and a plurality of cross pieces which secure the metal sheet across the adjacent walls of welded tubes. The metal sheet is formed in a manner so as to produce edges which contact a rhomboid area inclined to the plane of the metal sheet wherein two obtuse and two acute angles meet in each corner formed by four rhomboid areas. The metal sheet is further formed of a significantly thinner thickness than the wall thickness of the tubes. Each cross piece is formed of a thickness substantially equal to the wall thickness of the tubes and is shaped along one edge to facilitate securement as by welding to a tube of one wall. In addition, the opposite edge of each cross piece is shaped in complementary manner to the edge of the metal sheet to facilitate securement as by welding to the edge of the metal sheet from the outside.

During operation of the steam generator, especially at the starting of the generator from a cold condition, thermal expansion of the adjacent walls induces an expansion of the metal sheet through the cross pieces. However, since the metal sheet is expansive in construction, the metal sheet retains the sealing relation between the adjacent walls.

Accordingly, it is an object of the invention to provide an expansible linkage across adjacent walls of a steam generator which compensates for differential expansions of the walls while maintaining a seal between the walls.

It is another object of the invention to secure an expansible metal sheet across spaced adjacent walls of a steam generator in a simple efficient manner.

It is another object of the invention to position an expansible metal sheet across spaced adjacent walls of a steam generator in closely spaced relation to the walls.

It is another object of the invention to secure an expansible linkage to adjacent walls of a steam generator with cross pieces of a length to take on substantially the same temperature of the walls.

Figure 2:
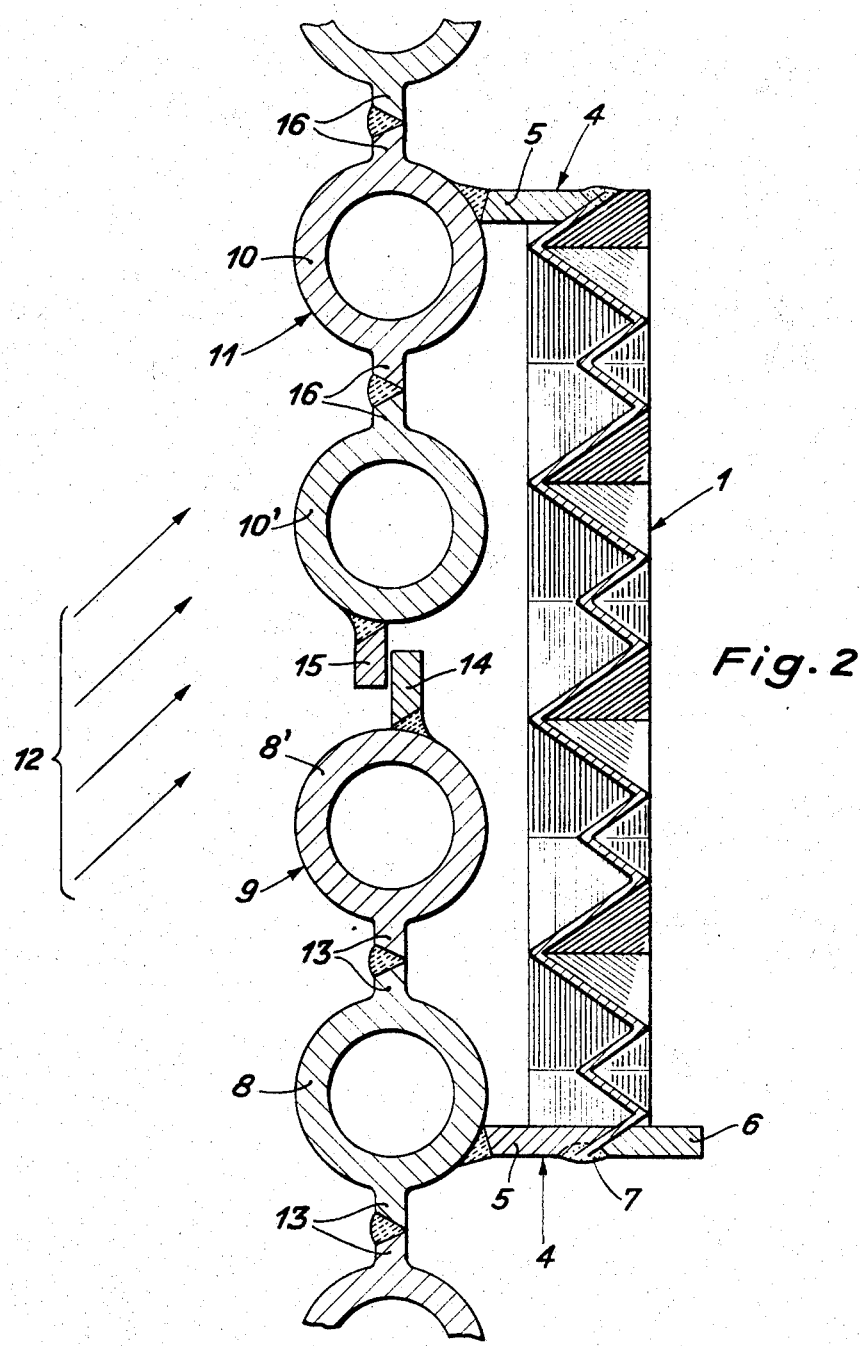

These and other objects and advantages of the invention will become more apparent from the following detailed description and appended claims taken in conjunction with the accompanying drawings in which:

FIG. 1 illustrates a perspective view of an expansible linkage of the invention; and FIG. 2 illustrates a cross sectional view of an expansible linkage disposed across adjacent walls of tubes of a stream generator.

Referring to FIG. 1, expansible metal sheet 1 is formed of a plurality of congruent rhomboids 2 each of which is an oblique-angled parallelogram area wherein the nonparallel sides are of unequal length and are inclined to the plane in which the metal sheet extends. The edges of the metal sheet 1 are formed to contact the oblique-angled parallelogram areas and each corner 3 formed by four parallelogram areas or rhomboids 2 includes two obtuse angles α and two acute angles β of the parallelogram areas. As shown in FIG. 1, the fourth parallelogram area forming each corner is not visible; however, for purposes of illustration one corner is shown with one obtuse angle α and two acute angles β and another corner is shown with one acute angle β and two obtuse angles α.

The shape and structure of the metal sheet 1 is such as to cause expansion of the sheet 1 in the Y direction, as indicated in FIG. 1, upon an elongation of the sheet 1 in the X direction transverse to the Y direction, as indicated in FIG. 1.

Each expansible metal sheet 1 is provided along the edges with at least one cross piece 4 at right angles to the plane of the metal sheet 1, only the cross pieces at one edge being illustrated. Each cross piece 4 is formed from a single metal strip which is cut longitudinally near the middle into two parts 5, 6, as by a welding torch, in a manner which forms an edge on each piece 5, 6 complementary to the course and inclination of the parallelogram areas at the edge of the metal sheet 1. When a welding torch is used for cutting, the torch is set at an incline to the metal strip and led along the metal strip in a zig-zag fashion in order to obtain the desired edges on the pieces 5, 6. Thereafter, the edge of the expansible metal sheet 1 is clamped between the edges of the pieces 5, 6 and fused thereto from the outside, as by a welding torch, so that a weld bead is produced with or without the application of further weld material.

Referring to FIG. 2, the tube plates 9, 11 of a lining or wall of a steam generator, for example, of the combustion chamber, are each formed of a plurality of interconnected tubes which are welded together over pigs 13, 16 and are spaced relative to each other at the ends. An expansible metal sheet 1 which is substantially thinner in thickness than the wall thickness of the tubes of the tube plates 9, 11 is disposed across the tube plates 9, 11 and secured by cross pieces 4 at opposite ends to respective tubes 8, 10 of the tube plates 9, 11 in order to seal the space between the tube plates. The cross pieces 4 which are secured as by welding to the tubes 10, 11 are of substantially the same thickness as the wall thicknesses of the tubes 8, 10 and are as short as possible so as to take on the temperatures of the walls of the tubes 8, 10. In addition, in order to protect the metal sheet 1 from a direct heat inflow, the uppermost pipe 8' of tube plate 9 and the lowermost pipe 10' of the tube plate 11 are provided with pigs 14, 15 in a conventional overlapping manner.

In operation, the tube plates 9, 11 are exposed on one side to a heat flow 12 caused, for example, by a super-pressure combustion. In addition, the tubes 8, 9 of each tube plate conduct a working medium therethrough in different states. For example, the tubes 8, 8' of tube plate 9 may conduct water or a vapor-water mixture while the tubes 10, 10' of tube plate 11 conduct superheated vapor. Thus, as a consequence of the various temperatures, the tube plates 9, 11 are subject to variable heat expansion. This variable heat expansion causes more expansion of the tube plate 11 in the axial direction of the tubes 10 than the tube plate 9. However, the metal sheet 1 expands under these differential thermal expansions to compensate for them while maintaining the sealing of the space limited by the tube plates 9, 11 to the outside.

It is noted that the cross piece 4 securing the expansible metal sheet 1 to the tube plates can be made in either of the forms shown in FIG. 2. In one form, the cross piece 4 at the lower end of the metal sheet 1 is formed of parts 5, 6 which clamp the metal sheet between each other. In the other form, the cross piece 4 at the upper end of the metal sheet 1 is formed of a single part 5. In both forms, the parts of the cross piece 4 are fused from the outside to the metal sheet with or without the use of additional weld material. When the latter form of cross piece is used, two parts are cut from a single metal strip, as described above, and one part is used to secure the lower end of the metal sheet to a first tube plate and the other part is used to secure the upper end of the metal sheet to a second tube plate.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

I claim:
1. An expansible linkage for disposition across a pair of spaced adjacent walls of tubes of a steam generator comprising:
   an expansible metal sheet formed of a plurality of rhomboid shaped parallelogram areas, said areas being obliquely angled with respect to the plane of said metal sheet to form corners at each of four contacting areas having a pair of obtuse angles and a pair of acute angles thereat to allow expansion of said metal sheet in one direction upon elongation in a transverse direction, and said metal sheet being thinner than the thickness of the walls of said tubes and having an upper edge and lower edge contacting obilque angled parallelogram areas inclined to the plane of said metal sheet, and
   at least one cross piece at each said edge of said metal sheet securing a respective edge of said edges to a tube of one of the respective walls, each said cross piece having an edge complementary to said respective edge of said metal sheet and being secured thereto from without.

2. An expansible linkage as set forth in claim 1 wherein each said edge of said metal sheet extends across the thickness of a respective cross piece.

3. An expansible linkage as set forth in claim 1 wherein said parallelogram areas are congruent rhomboids.

4. An expansible linkage as set forth in claim 1 wherein said cross pieces are substantially of the same thickness of the walls of the tubes in the walls and said expansible metal sheet is of thinner thickness than said cross pieces.

5. An expansible linkage as set forth in claim 1 wherein at least one of said cross pieces includes a first part fused on the outside to a tube of one of the walls and to one side of an edge of said metal sheet and a second part fused on the outside to the opposite side of said edge whereby said parts clamp said metal sheet therebetween.

6. An expansible linkage as set forth in claim 5 wherein said first and second parts have complementary edges thereon.

7. A method of forming an expansible linkage including an expansible metal sheet having edges contacting oblique angled parallelogram areas inclined to a plane of the metal sheet comprising the steps of cutting a single metal strip longitudinally in a zig-zag fashion at an incline to the metal strip to form two parts whereby each part has an edge complementary to the course and inclination of the edge of the expansible metal sheet, and of welding the two parts of the metal strip to the expansible metal sheet at an edge thereof from the outside.

8. A method as set forth in claim 7 wherein a cutting torch is utilized to cut the metal strip.

References Cited
UNITED STATES PATENTS
| | | | |
|---|---|---|---|
| 2,963,128 | 12/1960 | Rapp | 52—630 |
| 3,310,040 | 3/1967 | Michel | 122—510 |

FOREIGN PATENTS
| | | |
|---|---|---|
| 870,735 | 6/1961 | Great Britain. |

KENNETH W. SPRAGUE, *Primary Examiner.*